United States Patent
Lee et al.

(10) Patent No.: US 11,093,107 B2
(45) Date of Patent: Aug. 17, 2021

(54) PORTABLE TERMINAL AND ICON ARRANGING METHOD THEREOF

(71) Applicant: Samsung Display Co., Ltd., Yongin-Si (KR)

(72) Inventors: Seryun Lee, Asan-si (KR); Seung-gyun Woo, Hwaseong-si (KR); Jung-ho Myung, Seoul (KR); Jin-woo Jung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/460,075

(22) Filed: Jul. 2, 2019

(65) Prior Publication Data
US 2020/0026411 A1 Jan. 23, 2020

(30) Foreign Application Priority Data
Jul. 17, 2018 (KR) .................. 10-2018-0082796

(51) Int. Cl.
*G06F 3/048* (2013.01)
*G06F 3/0481* (2013.01)
*G06F 3/0484* (2013.01)

(52) U.S. Cl.
CPC ...... *G06F 3/04817* (2013.01); *G06F 3/04845* (2013.01); *G06F 2203/04804* (2013.01)

(58) Field of Classification Search
CPC combination set(s) only.
See application file for complete search history.

(56) References Cited

U.S. PATENT DOCUMENTS

| | | | |
|---|---|---|---|
| 2011/0050975 A1* | 3/2011 | Chung | H04M 1/0241 348/333.02 |
| 2011/0175930 A1* | 7/2011 | Hwang | G06F 3/0488 345/629 |

(Continued)

FOREIGN PATENT DOCUMENTS

| | | |
|---|---|---|
| KR | 1020140097904 A | 8/2014 |
| KR | 300844699 S | 3/2016 |

(Continued)

OTHER PUBLICATIONS

In-su Jeon, The LG V10's second screen, LG's new innovation after the knock on. pp. 1-13 [retrieved on Nov. 13, 2018]. Retrieved from the Internet<URL: https://kbench.com/?q=node/155918.

*Primary Examiner* — Wesner Sajous
(74) *Attorney, Agent, or Firm* — Cantor Colburn LLP

(57) ABSTRACT

A portable terminal includes a display module including a main display part and a sub-display part adjacent to the main display part and a control module which controls a main image displayed on the main display part and icon groups displayed on the sub-display part. When a first icon group among the icon groups is in an active state in which the first icon group is displayed through the sub-display part, a second icon group among the icon groups is controlled to be in an inactive state in which the second icon is not displayed through the main display part and the sub-display part. When an external input is detected on the sub-display part, the second icon group is controlled to be in an active state in which the second icon group is displayed through the sub-display part.

18 Claims, 14 Drawing Sheets

(56) References Cited

U.S. PATENT DOCUMENTS

2015/0279318 A1* 10/2015 Lee .................. G09G 5/02
　　　　　　　　　　　　　　　　　345/690
2018/0054903 A1　 2/2018 Yamamoto et al.
2018/0145937 A1* 5/2018 Choi .................. H04L 51/16

FOREIGN PATENT DOCUMENTS

KR　　　300859384 S　　6/2016
WO　　2009084368 A1　　7/2009

* cited by examiner

PORTABLE TERMINAL AND ICON ARRANGING METHOD THEREOF

This application claims priority to Korean Patent Application No. 10-2018-0082796, filed on Jul. 17, 2018, and all the benefits accruing therefrom under 35 U.S.C. § 119, the content of which in its entirety is herein incorporated by reference.

BACKGROUND

1. Field

Exemplary embodiments of the invention relate to a portable terminal, and more particularly, to a portable terminal and an icon arranging method thereof.

2. Description of the Related Art

Portable terminals perform data and voice communication functions, camera functions for taking pictures or recording videos, voice storage functions, playback functions of music files through speaker systems, and display functions of images or videos. Moreover, recent portable terminals may receive broadcast or multicast signals to watch images or television programs.

SUMMARY

A plurality of applications (hereinafter also referred to as icons) may be arranged on a desktop of a portable terminal. In this case, some of pictures displayed on a background screen of the portable terminal may be masked by the icons.

Exemplary embodiments of the invention provide a portable terminal and an icon arranging method thereof with improved user convenience.

An exemplary embodiment of the invention provides a portable terminal including a display module including a main display part and a sub-display part adjacent to the main display part, and a control module which controls a main image displayed on the main display part and icon groups displayed on the sub-display part, such that when a first icon group among the icon groups is in an active state in which the first icon group is displayed through the sub-display part, a second icon group among the icon groups is controlled to be in an inactive state in which the second icon group is not displayed through the main display part and the sub-display part, such that when an external input is detected on the sub-display part, the second icon group is controlled to be in an active state in which the second icon group is displayed through the sub-display part.

In an exemplary embodiment, the sub-display part may include a first sub-display part and a second sub-display part spaced apart with the main display part interposed therebetween, such that the first icon group may include a first sub-icon group displayed on the first sub-display part and a second sub-icon group displayed on the second sub-display part.

In an exemplary embodiment, when the external input is detected on at least one of the first sub-display part and the second sub-display part, at least one of the first sub-display part and the second sub-display part may display the second icon group.

In an exemplary embodiment, the second icon group may include a third sub-icon group and a fourth sub-icon group, such that when the external input is detected on at least one of the first sub-display part and the second sub-display part, the third sub-icon group may be displayed through the first sub-display part and the fourth sub-icon group may be displayed through the second sub-display part.

In an exemplary embodiment, when the third sub-icon group and the fourth sub-icon group are respectively displayed through the first sub-display part and the second sub-display part, each of the first sub-icon group and the second sub-icon group may be switched to the inactive state.

In an exemplary embodiment, when the external input is detected on the first sub-display part, the second sub-icon group may be displayed through the first sub-display part, and the second icon group may be displayed through the second sub-display part.

In an exemplary embodiment, an icon group displayed on the second sub-display part among the icon groups may be translucent.

In an exemplary embodiment, the first sub-icon group may be switched to the inactive state In an exemplary embodiment, an area of the main display part may be larger than an area of the sub-display part.

In an exemplary embodiment, when a first external input of the external input is detected through the sub-display part, the second icon group may be displayed through the sub-display part, such that when a second external input of the external input is detected through the sub-display part, a third icon group among the icon groups may be displayed through the sub-display part, such that when the third icon group is displayed through the sub-display part, the first icon group and the second icon group may be switched to the inactive state.

In an exemplary embodiment, when a first external input of the external input is detected through the sub-display part, the second icon group may be displayed through the sub-display part, such that when a second external input of the external input is detected through the sub-display part, the first icon group may be displayed through the sub-display part, such that while the first icon group is displayed through the sub-display part by the second external input, the second icon group and the other icon groups of the icon groups may be switched to the inactive state.

In an exemplary embodiment, the first sub-display part may extend from one end of the main display part and the second sub-display part may extend from the other end of the main display part.

In an exemplary embodiment, in a plan view, each of the first sub-display part and the second sub-display part may have a semicircular shape, and an outline of each of the first sub-display part and the sub-display part may have a curve.

In an exemplary embodiment, the display module further may include a bezel portion spaced from the main display part and adjacent the sub-display part, such that the bezel portion may be provided in a curved shape.

In an exemplary embodiment of the invention, a portable terminal includes a display module including a main display part which displays a main image, a first sub-display part which displays a first sub-image, and a second sub-display part which is spaced apart from the first sub-display part with the main display part interposed therebetween and displays a second sub-image, and a control module which outputs to the display module an image signal corresponding to the main image, and a first sub-image signal and a second sub-image signal corresponding to the first sub-image and the second sub-image, respectively, such that the display module displays the first sub-image through the first sub-display part and displays the second sub-image through the second sub-display part while the main image is displayed.

In an exemplary embodiment, the display module may further include a first bezel portion spaced from the main display part and adjacent the first sub-display part and a second bezel portion adjacent the second sub-display part, such that each of the first bezel portion and the second bezel portion may be provided in a curved shape.

In an exemplary embodiment, an area of a central portion of each of the first bezel portion and the second bezel portion may be larger than an area of an edge portion, and a camera module and an audio output module may be disposed at the central portion.

In an exemplary embodiment of the invention, an icon arrangement method of a portable terminal includes displaying a first icon group among a plurality of icon groups through a sub-display part adjacent to a main display part of a display module, sensing an external input through the sub-display part, and displaying a second icon group among the icon groups through the sub-display part according to the external input sensed through the sub-display part, such that in a case of an active state in which the first icon group is displayed through the sub-display part, the second icon group is in an inactive state in which the second icon group is not displayed through the sub-display part.

In an exemplary embodiment, when a first external input of the external input is detected first through the sub-display part, the second icon group may be displayed through the sub-display part, such that when a second external input of the external input is detected second through the sub-display part, any one of the first icon group and a third icon group among the icon groups may be displayed through the sub-display part.

In an exemplary embodiment, each of the icon groups may include at least one icon.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
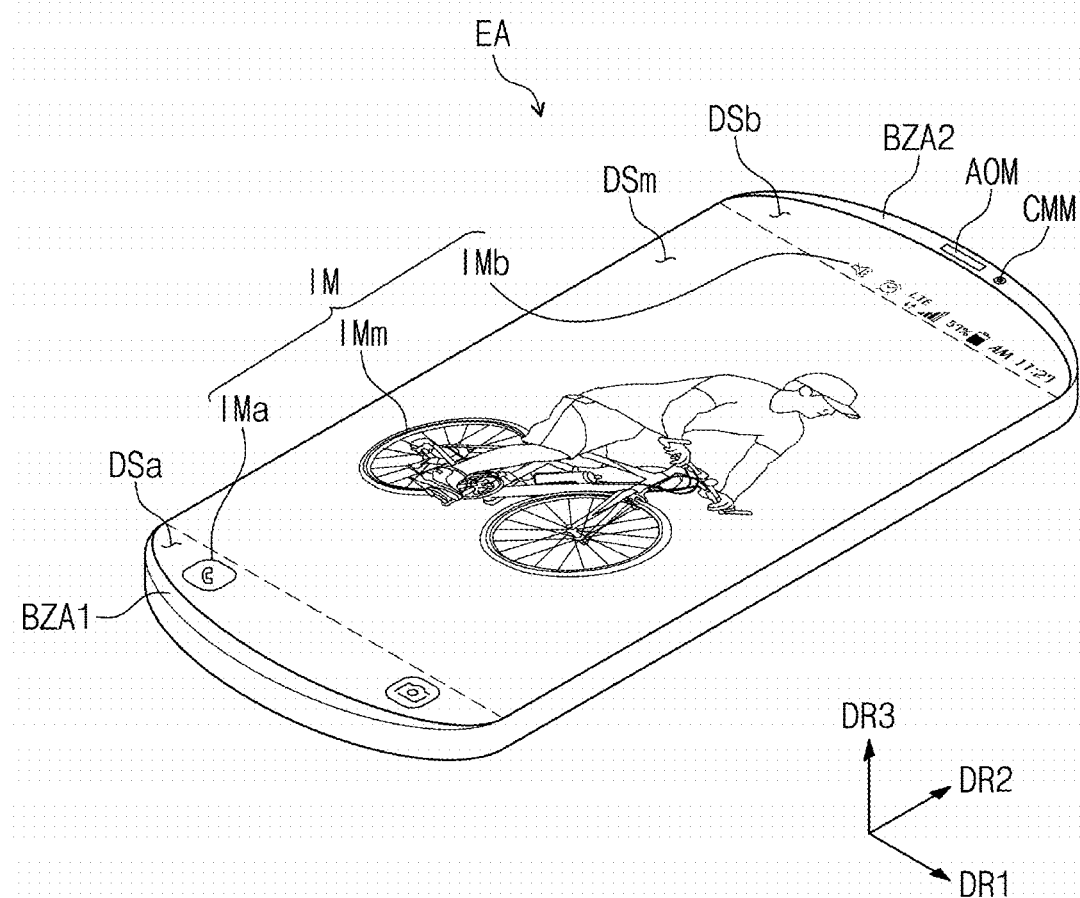
FIG. 1 is a perspective view of an exemplary embodiment of a portable terminal according to the invention.

In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description.

"And/or" includes all of one or more combinations defined by related components.

It will be understood that the terms "first" and "second" are used herein to describe various components but these components should not be limited by these terms. The above terms are used only to distinguish one component from another. In an exemplary embodiment, a first component may be referred to as a second component and vice versa without departing from the scope of the invention. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing.

Unless otherwise defined, all terms (including technical and scientific terms) used herein have the same meaning as terms commonly understood by those skilled in the art to which this invention belongs. Also, terms such as terms defined in commonly used dictionaries should be interpreted as having meaning consistent with meaning in the context of the related art, and unless the term is interpreted in an ideal or overly formal sense, they are explicitly defined here.

In various exemplary embodiments of the invention, the term "include," "comprise," "including," or "comprising," specifies a property, a region, a fixed number, a step, a process, an element and/or a component but does not exclude other properties, regions, fixed numbers, steps, processes, elements and/or components.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the drawings.

Figure 2A:
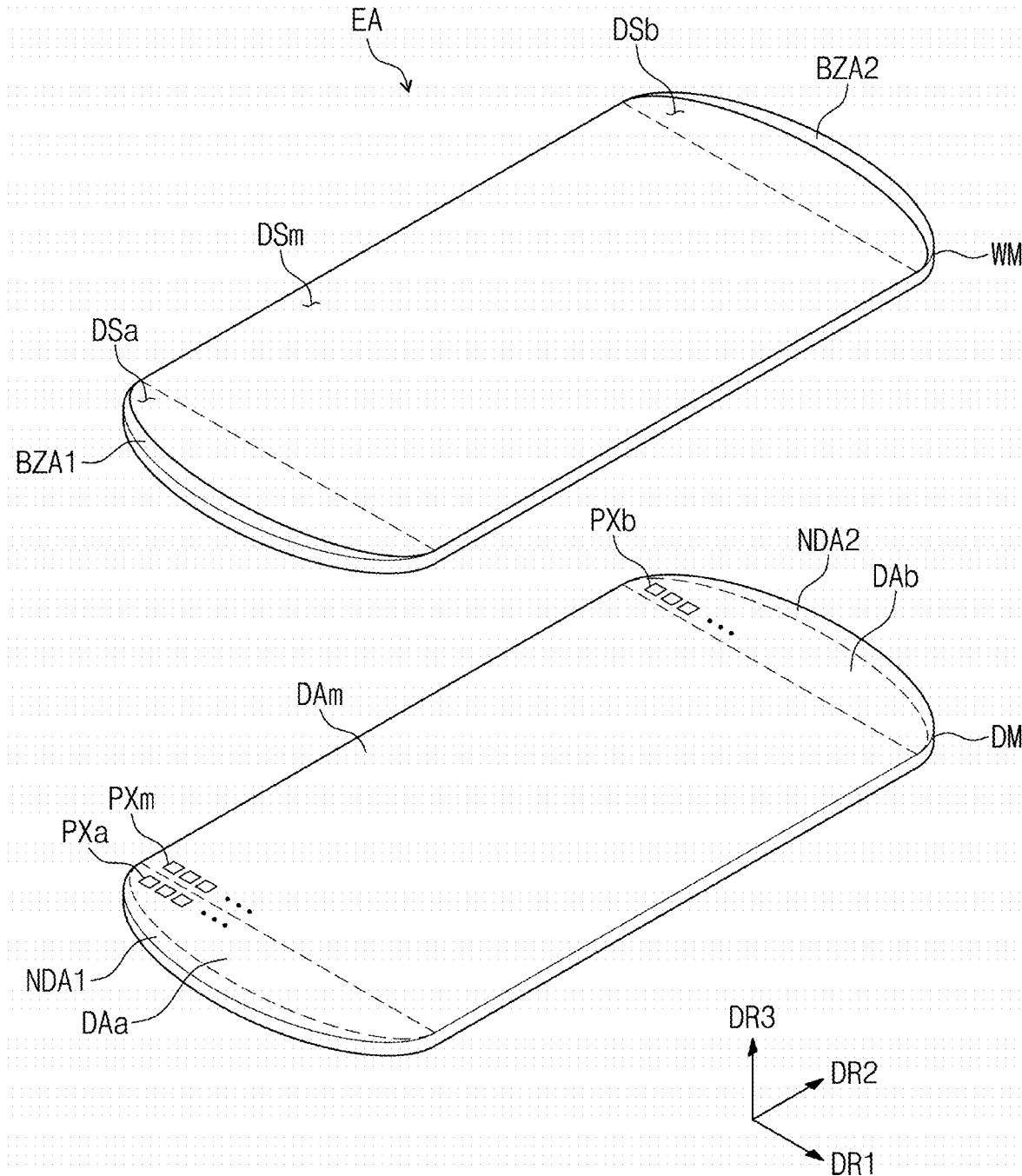
FIG. 2A is an exploded perspective view of an exemplary embodiment of a portable terminal according to the invention.
Figure 2B:
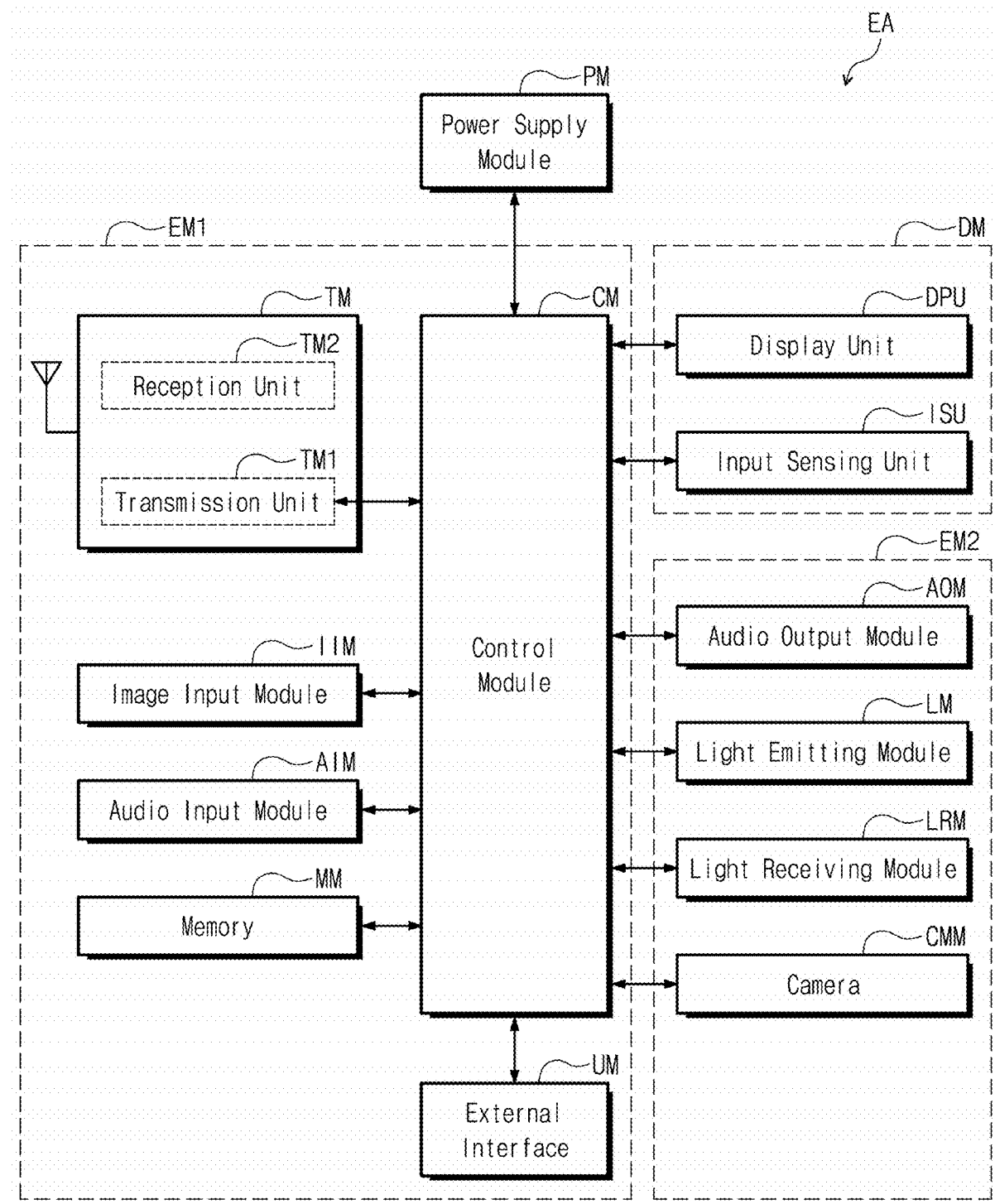
FIG. 2B is a block diagram of an exemplary embodiment of a portable terminal according to the invention.

FIG. 1 is a perspective view of a portable terminal according to an exemplary embodiment of the invention. FIG. 2A is an exploded perspective view of a portable terminal according to an exemplary embodiment of the invention. FIG. 2B is a block diagram of a portable terminal according to an exemplary embodiment of the invention.

Referring to FIG. 1, a portable terminal EA may be a device activated according to an electrical signal. The portable terminal EA may include various exemplary embodiments. In an exemplary embodiment, the portable terminal EA may include a tablet, a notebook, a computer, a smart television, and the like, for example. In this exemplary embodiment, the portable terminal EA is exemplified as a smart phone.

The portable terminal EA may provide a display part (e.g., display surface) that displays an image on the front side. According to an exemplary embodiment of the invention, the display part includes a main display part DSm, a first sub-display part DSa, and a second sub-display part DSb, each of which displays a different image. The main display part DSm displays the main image IMm and the first sub-display part DSa displays the first sub-image IMa and the second sub-display part DSb displays the second sub-image IMb.

Illustratively, as shown in FIG. 1, a bicycle is shown as the main image IMm, and weather information is shown as a first sub-image IMa, and icons are shown as a second sub-image IMb, for example.

Although it is described that the main display part DSm, the first sub-display part DSa, and the second sub-display part DSb display different images, the invention is not limited thereto. As another example, one image may be displayed through the main display part DSm, the first sub-display part DSa, and the second sub-display part DSb. As another example, one image may be displayed through the main display part DSm, the first sub-display part DSa, and the second sub-display part DSb, and simultaneously, the first sub-image IMa and the second sub-image IMb may additionally be displayed on the first sub-display part DSa and the second sub-display part DSb, respectively, for example.

More specifically, the main display part DSm may be defined parallel to a plane defined by the first direction DR1 and the second direction DR2. The normal direction of the main display part DSm may correspond to the thickness direction (DR3, hereinafter also referred to as the third direction) of the portable terminal EA. According to an exemplary embodiment of the invention, the front surface (or upper surface) and the rear surface (or lower surface) of each member are defined based on the direction in which the image IM is displayed. The front surface and the rear surface are opposed to each other in the third direction DR3. Moreover, the directions that the first to third directions DR1, DR2, and DR3 indicate may be converted to other directions as a relative concept.

As shown in FIG. 1, the main display part DSm may have a rectangular shape parallel to each of the first direction DR1 and the second direction DR2. However, this is illustrated by way of example, and in other exemplary embodiments, the main display part DSm may have various other shapes and is not limited to any one exemplary embodiment.

The first sub-display part DSa and the second sub-display part DSb may be spaced apart from each other in the second direction DR2 with the main display part DSm therebetween. In the second direction DR2, the first sub-display part DSa is provided in a shape extending from one end of the main display part DSm, and the second sub-display part DSb may be provided in a shape extending from the other end of the main display part DSm.

According to an exemplary embodiment of the invention, in a plan view, each of the first sub-display part DSa and the second sub-display part DSb may be provided in a semicircular shape. The virtual interface between the first sub-display part DSa and the main display part DSm may be straight and the outline of the first sub-display part DSa may be curved. Similarly, the virtual interface between the second sub-display part DSb and the main display part DSm may be straight and the outline of the second sub-display part DSb may be curved.

Also, according to an exemplary embodiment, the first sub-display part DSa and the second sub-display part DSb may have symmetrical shapes with respect to the main display part DSm.

The bezel portion may be positioned adjacent to the display part as the portion where the image is not displayed. The bezel portion according to an exemplary embodiment of the invention includes a first bezel portion BZA1 adjacent to the first sub-display part DSa and a second bezel portion BZA2 adjacent to the second sub-display part DSb. The bezel portion is described as a portion where no image is displayed, but the bezel portion may be composed of at least one print layer to express a specific color.

According to an exemplary embodiment of the invention, in a plan view, each of the first bezel portion BZA1 and the second bezel portion BZA2 may have a curved shape. That is, the first bezel part BZA1 may be provided in a curved shape corresponding to the outline of the first sub-display part DSa, and the second bezel part BZA2 may be provided in a curved shape corresponding to the outline of the second sub-display part DSb.

Further, an area of the central portion of each of the first bezel portion BZA1 and the second bezel portion BZA2 in a plan view may be larger than an area of the edge portion. In particular, a camera module CMM and an audio output module AOM may be formed in a central portion of any one of the first bezel portion BZA1 and the second bezel portion BZA2. As an example, according to an exemplary embodiment of the invention, the camera module CMM and the audio output module AOM are shown formed in the central portion of the second bezel portion BZA2.

Referring to FIG. 2A, the portable terminal EA includes a display module DM and a window member WM. Referring to FIG. 2B, the portable terminal EA may further include a first electronic module EM1, a second electronic module EM2, and a power supply module PM. FIG. 2A shows some of the configurations shown in FIG. 2B. Hereinafter, the portable terminal EA will be described in detail with reference to FIGS. 2A and 2B.

Referring to FIG. 2A, the display module DM may display an image or sense an externally applied input. In an exemplary embodiment, the display module DM may include a display unit DPU for displaying an image IM and an input sensing unit ISU for sensing an external input, for example.

The input sensing unit ISU senses an externally applied input. In an exemplary embodiment, the external inputs include various types of external inputs such as a part of the user's body, light, heat, or pressure, for example. The external input may be an input applied to the window member WM.

The display unit DPU and the input sensing unit ISU may be independently formed and physically coupled through a predetermined adhesive member. In an alternative exemplary embodiment, the display unit DPU and the input sensing unit ISU may be sequentially stacked on a single base substrate.

In the display module DM according to an exemplary embodiment of the invention, either the display unit DPU or the input sensing unit ISU may be omitted. A case where the display module DM according to the embodiment includes the display unit DPU and omits the input sensing unit ISU will be described as one example.

In detail, the display module DM includes a main display area DAm, a first sub-display area DAa, and a second sub-display area DAb, which are distinguished in a plan view. In addition, the display module DM also includes a first peripheral area NDA1 adjacent to the first sub-display area DAa and a second peripheral area NDA2 adjacent to the second sub-display area DAb.

According to an exemplary embodiment of the invention, the main display area DAm, the first sub-display area DAa, and the second sub-display area DAb correspond to the main display part DSm, the first sub-display part DSa, and a second sub-display part DSb, respectively. Illustratively, the main display part DSm, the first sub-display part DSa, and the second sub-display part DSb may cover the main display area DAm, the first sub-display area DAa, and the second sub-display area DAb, respectively.

Also, the first peripheral area NDA1 and the second peripheral area NDA2 may correspond to the first bezel portion BZA1 and the second bezel portion BZA2, respectively, described with reference to FIG. 1. Illustratively, the first bezel portion BZA1 and the second bezel portion BZA2 may cover the first peripheral area NDA1 and the second peripheral area NDA2, respectively.

Each of the main display area DAm, the first sub-display area DAa, and the second sub-display area DAb may be an area where an image is displayed. The display module DM includes the pixels PXm, PXa, and PXb disposed in the main display area DAm, the first sub-display area DAa, and the second sub-display area DAb, respectively. In detail, a plurality of main pixels PXm is arranged in the main display area DAm, a plurality of first sub-pixels PXa is arranged in the first sub-display area DAa, and a plurality of second sub-pixels PXb is arranged in the second sub-display region DAb. The light generated by the pixels PXm, PXa, and PXb implements the image IM.

According to an exemplary embodiment of the invention, although it is described that the first bezel portion BZA1 and the second bezel portion BZA2 are disposed adjacent to the first sub-display area DAa and the second sub-display area DAb, respectively, the invention is not limited thereto, and at least one of the first bezel portion BZA1 and the second bezel portion BZA2 may be omitted.

The window member WM provides the front surface of the portable terminal EA. Thus, the window member WM includes the main display part DSm, the first sub-display part DSa, and the second sub-display part DSb described with reference to FIG. 1. Also, the window member WM may include the first bezel portion BZA1 and the second bezel portion BZA2 described with reference to FIG. 1.

The window member WM may be disposed on the front surface of the display module DM to protect the display module DM. In an exemplary embodiment, the window member WM may include a glass substrate, a sapphire substrate, or a plastic film, for example. The window member WM may have a multi-layer or single-layer structure. In an exemplary embodiment, the window member WM may have a laminated structure of a plurality of plastic films bonded with an adhesive, or may have a laminated structure of a glass substrate and a plastic film bonded with an adhesive, for example.

Referring to FIG. 2B, the portable terminal EA may include a power supply module PM, a first electronic module EM1, and a second electronic module EM2. The power supply module PM supplies power necessary for the overall operation of the portable terminal EA. The power supply module PM may include a conventional battery module.

The first electronic module EM1 and the second electronic module EM2 include various functional modules for operating the portable terminal EA. The first electronic module EM1 may be directly disposed (e.g., mounted) on a motherboard electrically connected to the display module DM or may be disposed (e.g., mounted) on a separate board and electrically connected to the motherboard through a connector (not shown) or the like.

The first electronic module EM1 may include a control module CM, a wireless communication module TM, an image input module IIM, an audio input module AIM, a memory MM, and an external interface UM. Some of the modules may not be disposed (e.g., mounted) on the motherboard, but may be electrically connected to the motherboard through a flexible circuit board.

The control module CM controls the overall operation of the portable terminal EA. In an exemplary embodiment, the control module CM may be a microprocessor, for example. In an exemplary embodiment, the control module CM activates or deactivates the display module DM, for example. The control module CM may control other modules such as the image input module IIM and the audio input module AIM based on the touch signal received from the display module DM.

The wireless communication module TM may transmit/receive a wireless signal to/from another terminal using a Bluetooth or a Wi-Fi line. The wireless communication module TM may transmit/receive a voice signal using a general communication line. The wireless communication module TM includes a transmission unit TM1 for modulating and transmitting a signal to be transmitted, and a reception unit TM2 for demodulating the received signal.

The image input module IIM processes the image signal and converts the image signal into image data that may be displayed on the display module DM. The audio input module AIM receives an external audio signal by a microphone in a recording mode, a voice recognition mode, etc., and converts it into electrical voice data.

In an exemplary embodiment, the external interface UM serves as an interface to an external charger, a wired/wireless data port, a card socket (e.g., a memory card, a SIM/UIM card), for example.

The second electronic module EM2 may include an audio output module AOM, a light emitting module LM, a light receiving module LRM, and a camera module CMM. The configurations may be directly disposed (e.g., mounted) on the motherboard, or disposed (e.g., mounted) on a separate substrate and electrically connected to the display module DM through a connector (not shown), or electrically connected to the first electronic module EM1.

The audio output module AOM converts the audio data received from the wireless communication module TM or the audio data stored in the memory MM and outputs the audio data to the outside.

The light emitting module LM generates and outputs light. In an exemplary embodiment, the light emitting module LM may output infrared rays, for example. In an exemplary embodiment, the light emitting module LM may include a light emitting diode ("LED") element, for example. The light receiving module LRM may detect infrared rays. The light receiving module LRM may be activated when an infrared ray of a predetermined level or higher is detected. In an exemplary embodiment, the light receiving module LRM may include a complementary metal oxide semiconductor ("CMOS") sensor, for example. After the infrared light generated by the light emitting module LM is outputted, the infrared light is reflected by an external object (e.g., a user finger or a face), and the reflected infrared light may be incident on the light receiving module LRM. The camera module CMM captures an image of the outside.

Figure 3:
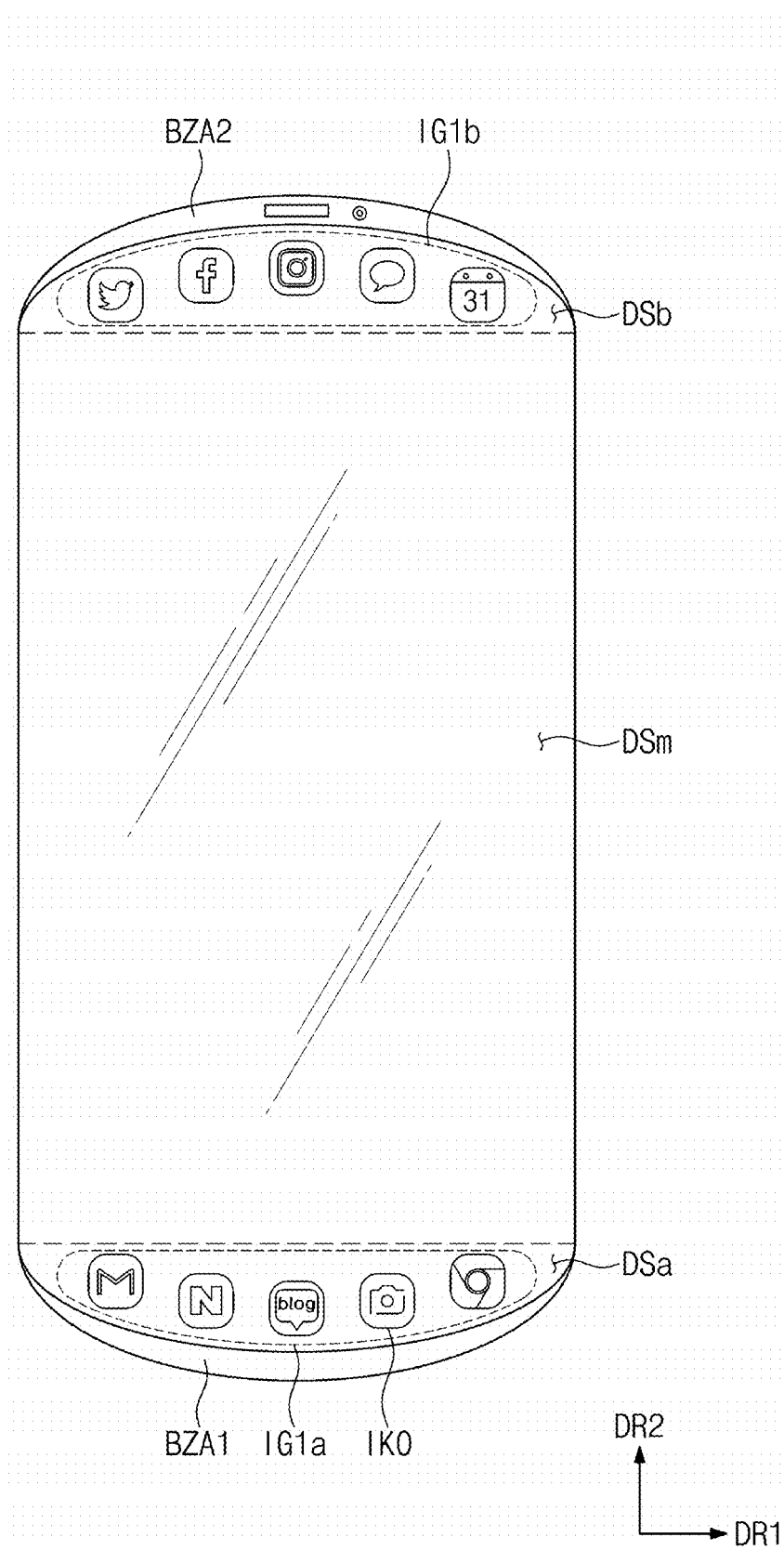
FIG. 3 is a plan view of an exemplary embodiment of a portable terminal displaying a first icon group according to the invention.
Figure 4:
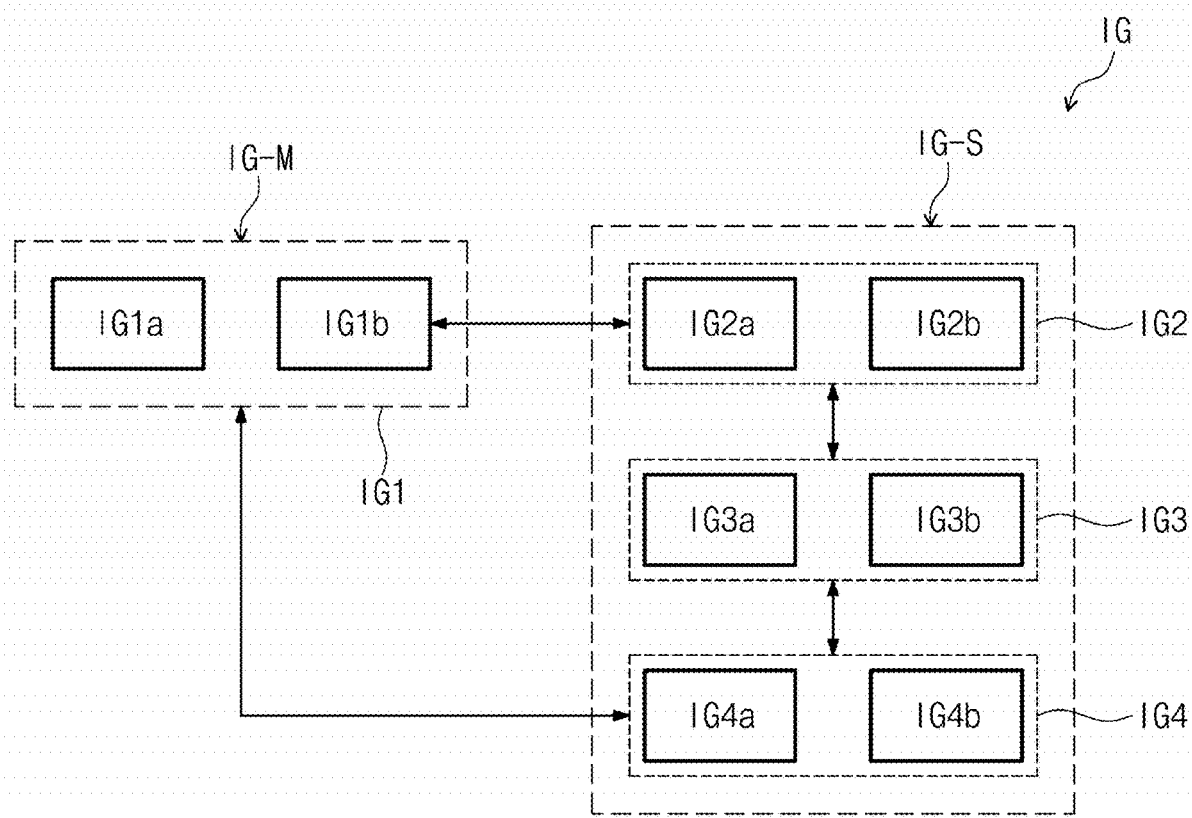
FIG. 4 is a block diagram illustrating an exemplary embodiment of icon groups according to the invention.
Figure 5:
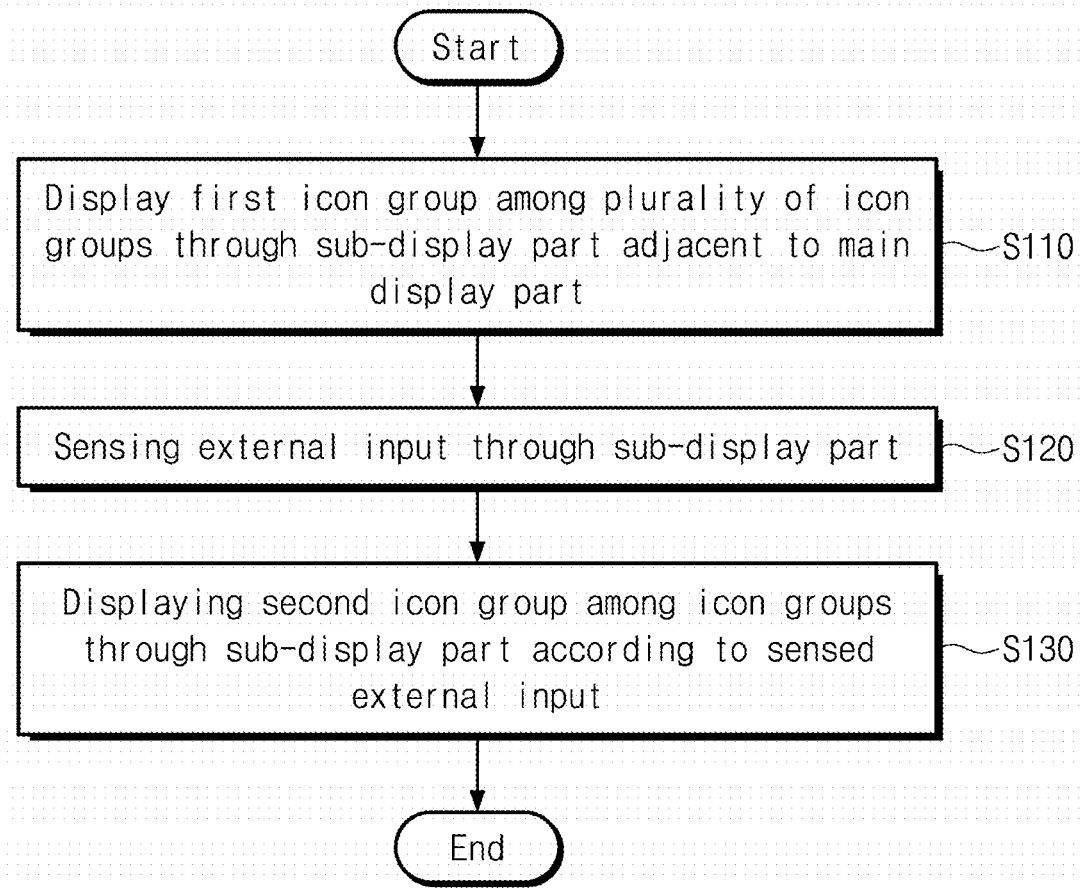
FIG. 5 is a flowchart illustrating an exemplary embodiment of an icon arrangement method of a portable terminal according to the invention.
Figure 6:
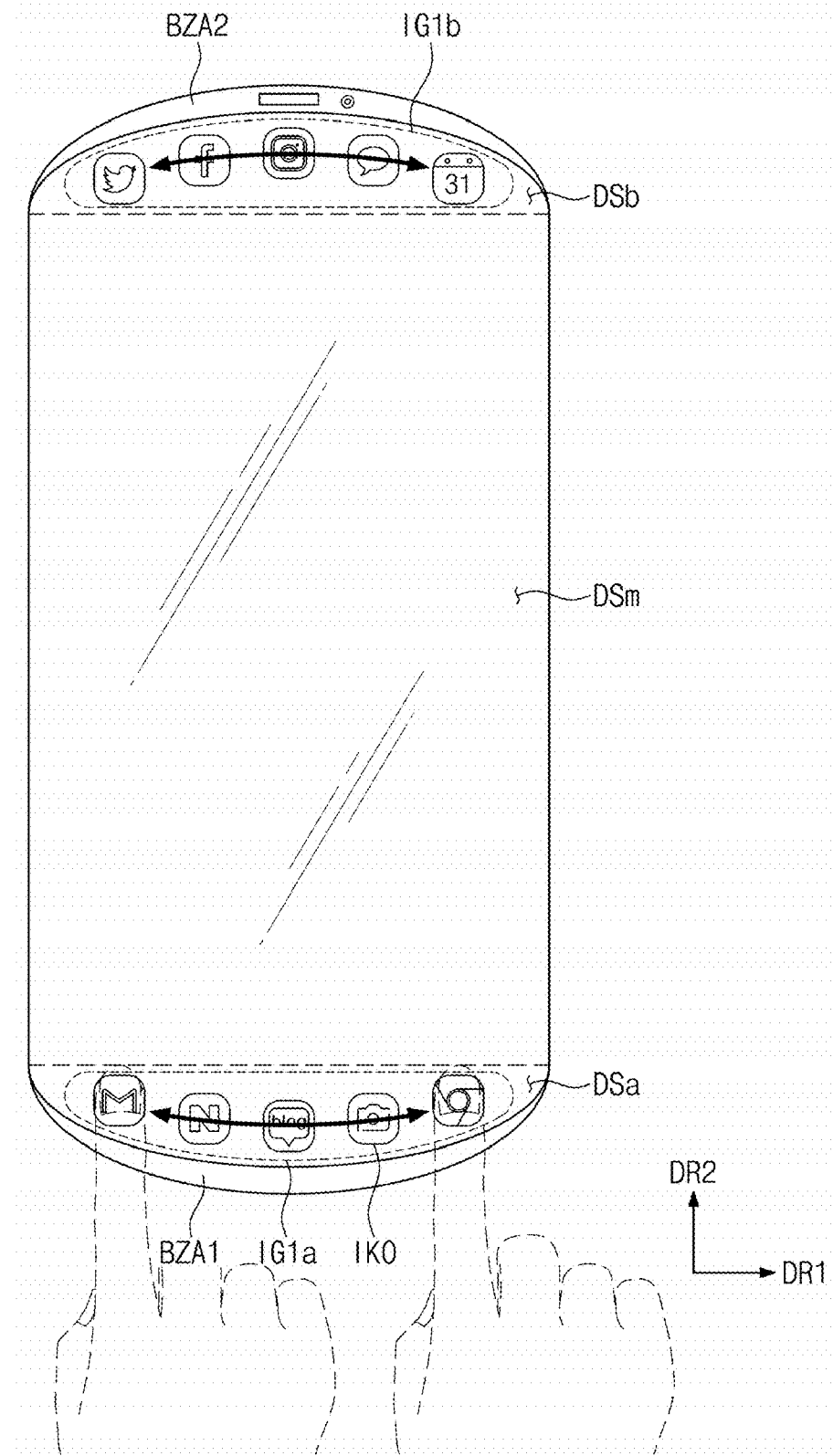
FIG. 6 is a plan view of an exemplary embodiment of a portable terminal according to the invention.
Figure 7A:
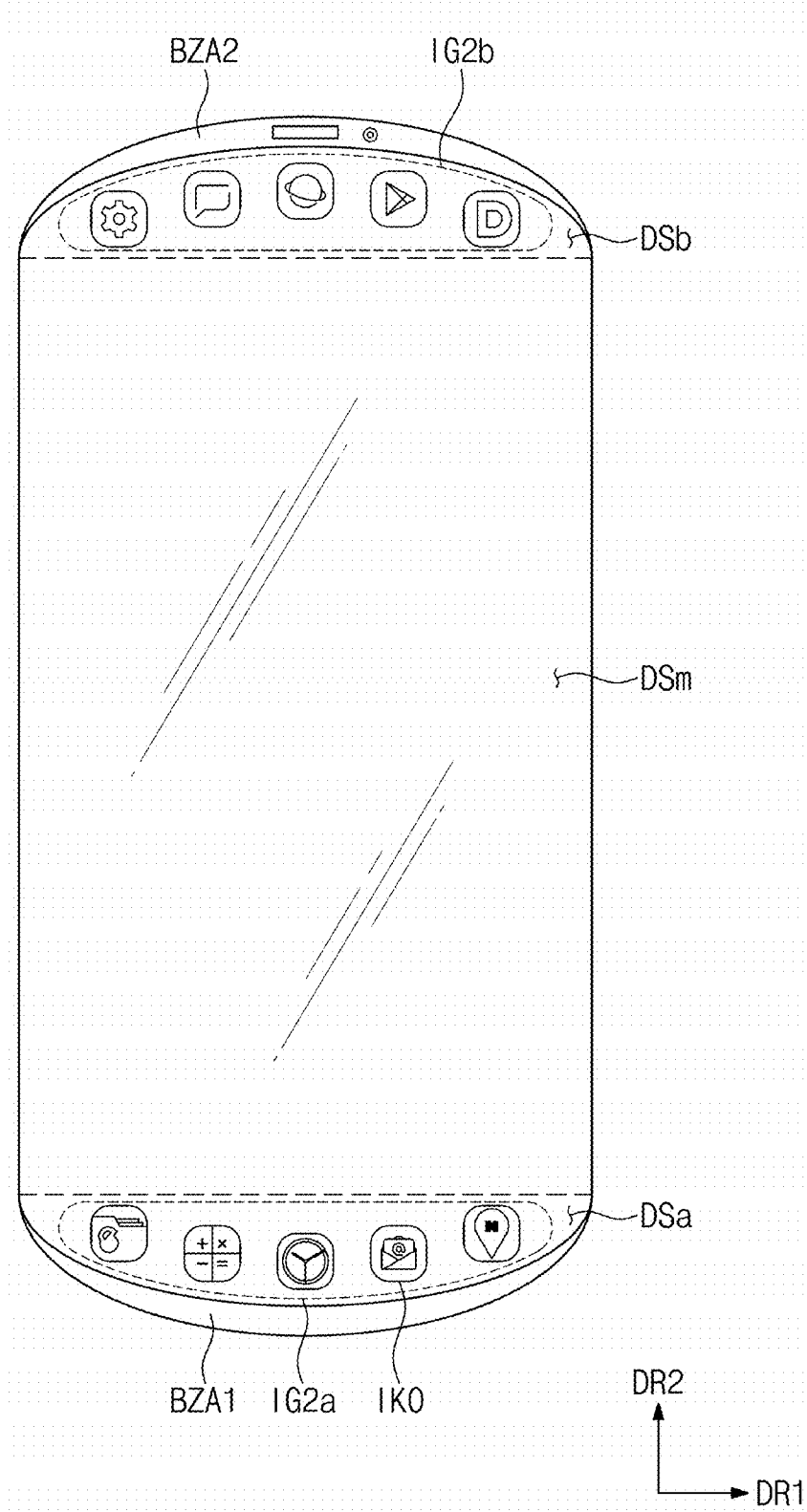
FIG. 7A is a plan view of an exemplary embodiment of a portable terminal displaying a second icon group according to the invention.
Figure 7B:
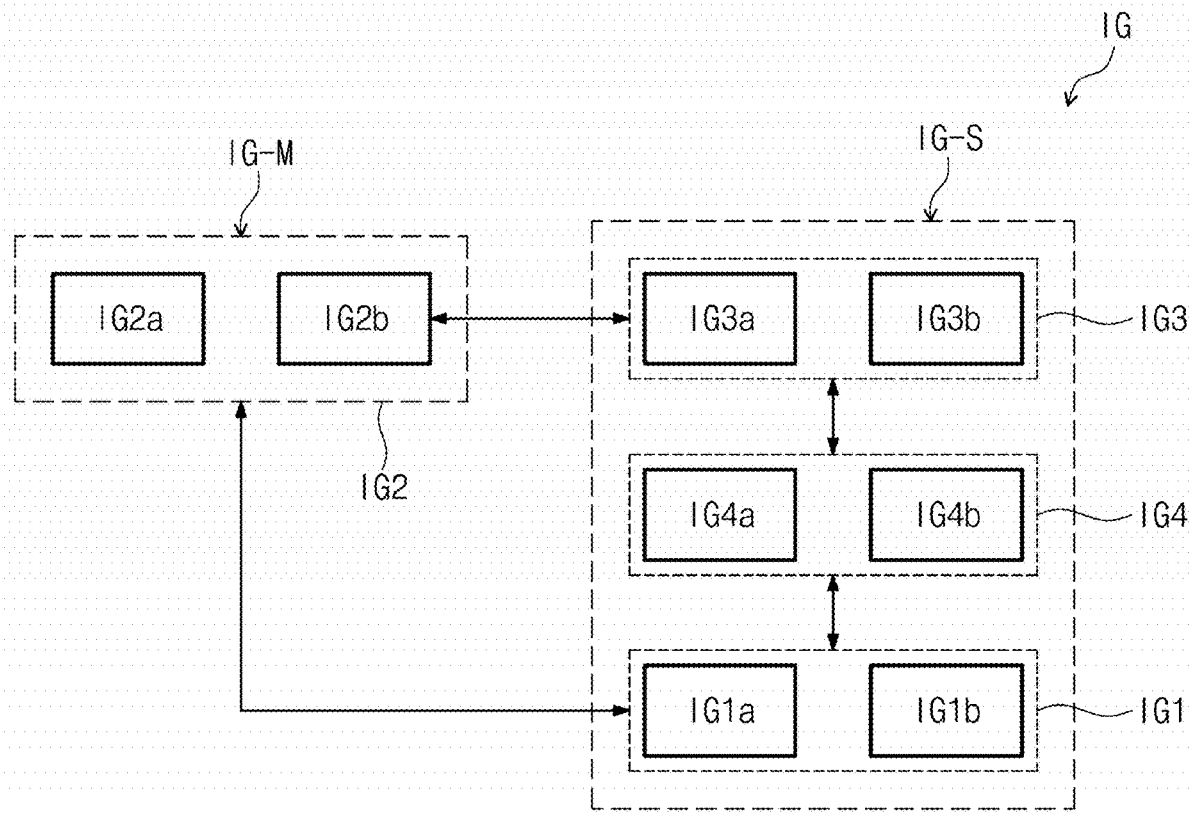
FIG. 7B is a block diagram illustrating an exemplary embodiment of icon groups according to the invention.

FIG. 3 is a plan view of an exemplary embodiment of a portable terminal displaying a first icon group according to the invention. FIG. 4 is a block diagram illustrating an exemplary embodiment of an icon group according to the invention. FIG. 5 is a flowchart illustrating an exemplary embodiment of an icon arrangement method of a portable terminal according to the invention. FIG. 6 is a plan view of an exemplary embodiment of a portable terminal according to the invention. FIG. 7A is a plan view of an exemplary embodiment of a portable terminal displaying a second icon group according to the invention. FIG. 7B is an exemplary embodiment of a block diagram illustrating icon groups according to the invention.

First, referring to FIG. 3, as described above with reference to FIG. 2A, the portable terminal EA may display an image through each of the main display part DSm, the first sub-display part DSa, and the second sub-display part DSb.

According to an exemplary embodiment of the invention, in a plan view, the area of the main display part DSm may be greater than the sum of the area of the first sub-display part DSa and the area of the second sub-display part DSb. That is, the main display part DSm according to an exemplary embodiment of the invention displays images executed through the icons IKO, and the sub-display parts DSa and DSb display convenience information set for the convenience of the user such as weather, time, icons IKO and the like.

According to an exemplary embodiment of the invention, the icons IKO may be displayed through the first sub-display area DAa and the second sub-display area DAb. Here, the icon means an application in which a specific program may be executed by external input.

As described above, the main display area DAm may display only the main image corresponding to the image signal provided from the control module CM (refer to FIGS. 2A and 2B). While the main image displayed from the main display area DAm is displayed, the icons IKO may be indicated by the first sub-display part DSa and the second sub-display part DSb. Therefore, the visibility of the main image may be further improved.

Referring to FIGS. 3 and 4, the portable terminal EA may display some of the icon groups IG through the first sub-display area DAa and the second sub-display area DAb. Illustratively, although it is described that the icon groups IG according to an exemplary embodiment of the invention include first to fourth icon groups IG1 to IG4, the number of icon groups is not particularly limited.

The first icon group IG1 includes a first sub-icon group IG1$a$ and a second sub-icon group IG1$b$. The second icon group IG2 includes a third sub-icon group IG2$a$ and a fourth sub-icon group IG2$b$. The third icon group IG3 includes a fifth sub-icon group IG3$a$ and a sixth sub-icon group IG3$b$. The fourth icon group IG4 includes a seventh sub-icon group IG4$a$ and an eighth sub-icon group IG4$b$. Each sub-icon group may include at least one icon.

The first, third, fifth, and seventh sub-icon groups IG1$a$, IG2$a$, IG3$a$, and IG4$a$ are displayed through the first sub-display part DSa and the second, fourth, sixth, and eighth sub-icon groups IG1$b$, IG2$b$, IG3$b$, may IG4$b$ may be indicated through the second sub-display part DSb.

According to an exemplary embodiment of the invention, the first to fourth icon groups IG1 to IG4 may be divided into an active state IG-M displayed on the display part of the portable terminal EA and an inactive state IG-S not displayed on the display part of the portable terminal EA. In particular, one icon group of the first to fourth icon groups IG1 to IG4 may be controlled in the active state IG-M, and the remaining group of icons may be controlled in the inactive state IG-S.

According to an exemplary embodiment of the invention, when an external input is sensed through either the first sub-display part DSa and the second sub-display part DSb, the control module CM (refer to FIG. 2B) may change the active state IG-M and the inactive state IG-S between the icon groups.

Hereinafter, a method of arranging the icons IKO through the first sub-display area DAa and the second sub-display area DAb will be described in detail.

Referring to FIGS. 4 and 5, in the first operation S110, during the initial display state of the portable terminal EA, the display module DM displays the first icon group IG1 among the plurality of icon groups IG through the first sub-display part DSa and the second sub-display part DSb. That is, in the first display state of the portable terminal EA, the first icon group IG1 is in the active state IG-M and the second to fourth icon groups IG2 to IG4 are in the inactive state IG-S. Thus, the first sub-icon group IG1$a$ arranged in the first sub-display part DSa is displayed and the second sub-icon group IG1$b$ arranged in the second sub-display part DSb is displayed. The second to fourth icon groups IG2 to IG4 are not displayed through the main display part DSm, the first sub-display part DSa, and the second sub-display part DSb.

In the second operation S120, when an external input is detected through either the first sub-display part DSa or the second sub-display part DSb, the control module CM may deliver to the display module DM a change signal for changing the group of icons displayed through the first sub-display part DSa and the second sub-display part DSb.

In detail, as shown in FIG. 6, the user's hand may drag the first sub-display part DSa along the first direction DR1. In this case, the display module DM may sense an external input and transmit the sensed detection signal to the control module CM. As a result, in response to the detection signal, the control module CM may deliver to the display module DM a change signal for changing the first group of icons IG1 displayed through the first sub-display part DSa and the second sub-display part DSb.

The external input method described with reference to FIG. 6 is merely an example, and external input may be detected from the first sub-display part DSa and the second sub-display part DSb by various touch methods. As another example, an external input may be sensed by two consecutive touches.

In the third operation S130, in response to the change signal outputted from the control module CM, the display module DM displays the second icon group IG2 of the second to fourth icon groups IG2 to IG4 through the first sub-display part DSa and the second sub display part DSb.

As shown in FIGS. 7A and 7B, the third sub-icon group IG2a and the fourth sub-icon group IG2b of the second icon group IG2 may be displayed on the first sub-display part DSa and the second sub-display part DSb, respectively. That is, the second icon group IG2 is switched to the active state IG-M and is displayed through the display part of the portable terminal EA, and the first icon group IG1 may be switched to the inactive state IG-S and not be displayed from the portable terminal EA. In addition, the third and fourth icon groups IG3 and IG4 may be also in the inactive state IG-S and may not be displayed from the portable terminal EA.

Hereinafter, the first sub-display part DSa and the second sub-display part DSb may be described with a sub-display part. The detection of an external input through the sub-display part may indicate that an external input is detected through either the first sub-display part DSa or the second sub-display part DSb.

Although not shown in the drawing, when an external input is detected again in the sub-display part, the third icon group IG3 is displayed through the first sub-display part DSa and the second sub-display part DSb.

In an exemplary embodiment, in the initial display state, when the external input is first detected through the sub-display part, the second icon group IG2 may be displayed through the sub-display part, for example. Then, when an external input is detected a second time through the sub-display part, the third icon group IG3 may be displayed through the sub-display part. Thereafter, when an external input is detected a third time through the sub-display part, the fourth icon group IG4 may be displayed through the sub-display part.

In this case, referring to FIG. 6, it may be a case where the first through third external inputs may be respectively dragged in the same direction. In an exemplary embodiment, when the dragging proceeds counterclockwise, the second to fourth icon groups IG2 to IG4 may be sequentially switched to the active state IG-M in the order described above, for example.

When the second detected external input is dragged in the clockwise direction, the first icon group IG1 may be displayed again through the sub-display part. In this case, the second to fourth icon groups IG2 to IG4 may be maintained in an inactive state IG-S.

Figure 8A:
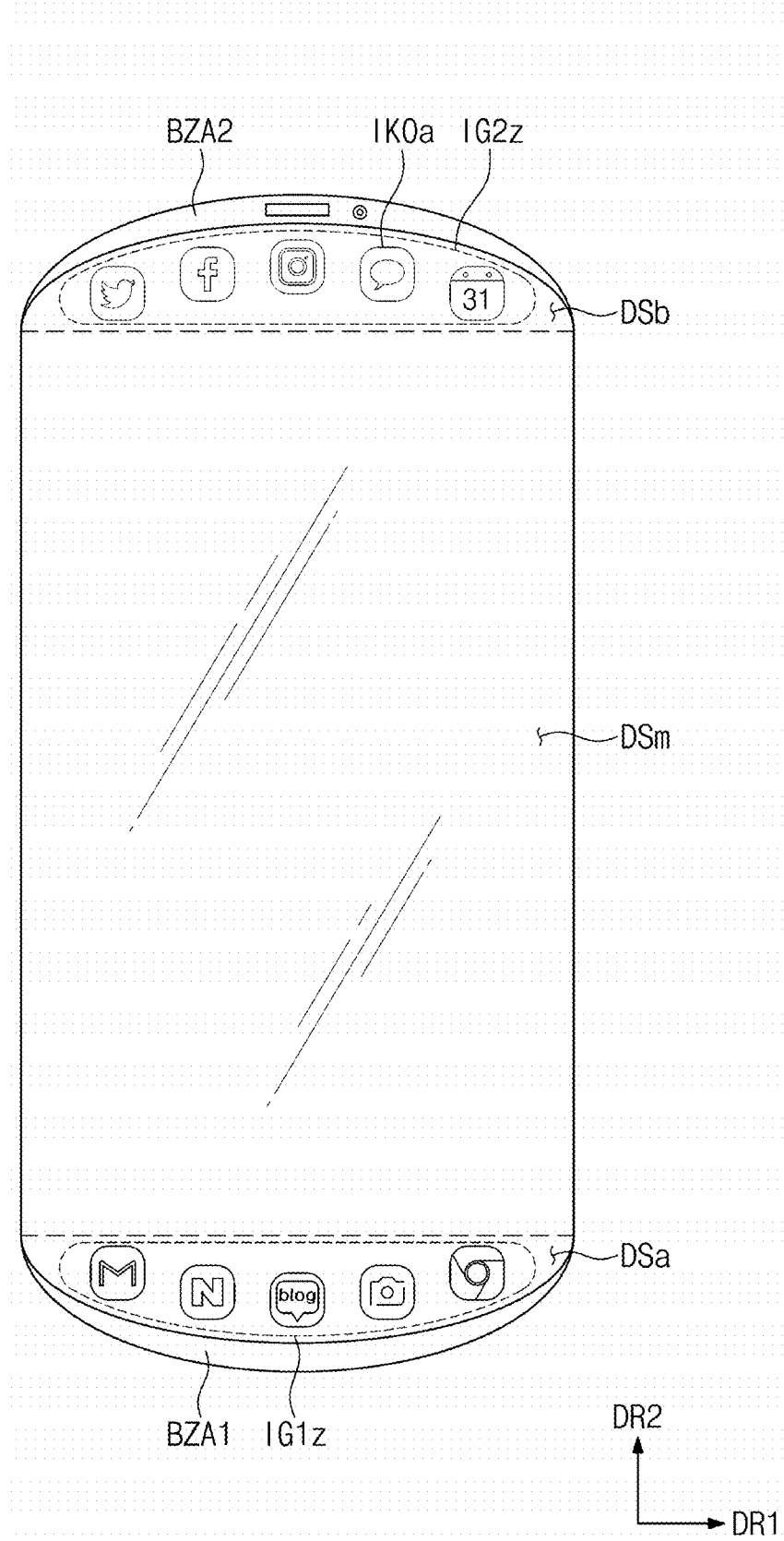
FIG. 8A is a plan view of another exemplary embodiment of a portable terminal showing icon groups according to the invention.
Figure 8B:
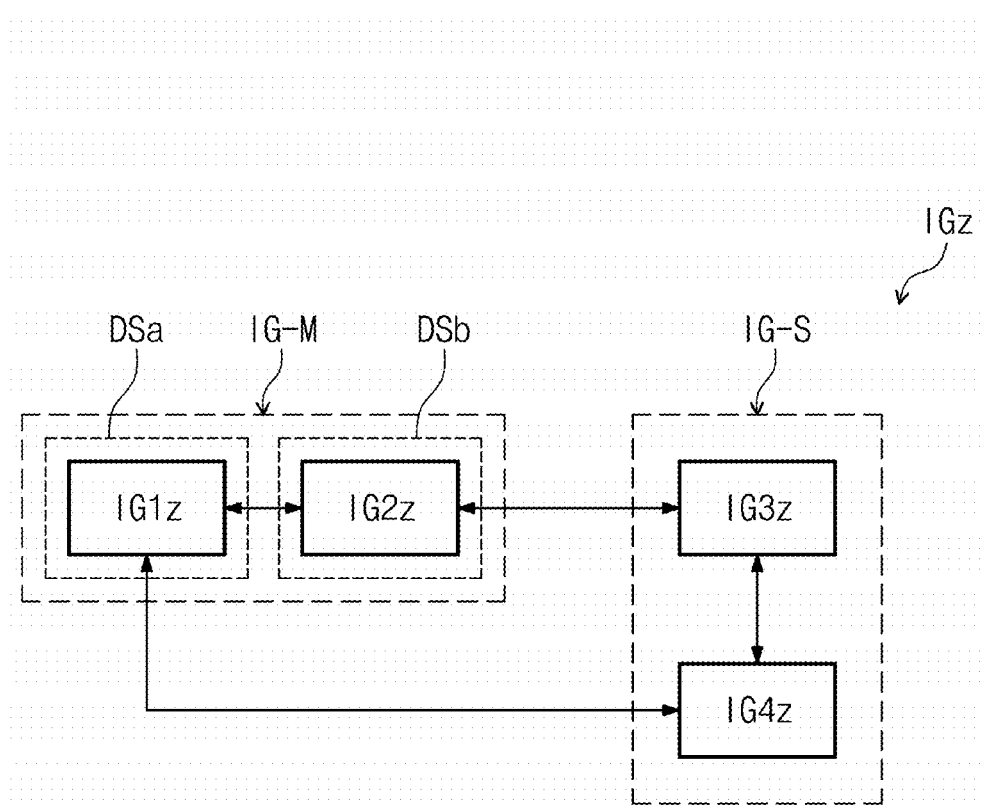
FIG. 8B is a block diagram illustrating another exemplary embodiment of icon groups according to the invention.

FIG. 8A is a plan view of another exemplary embodiment of a portable terminal showing icon groups according to the invention. FIG. 8B is a block diagram illustrating another exemplary embodiment of icon groups according to the invention.

The icon group IGz shown in FIG. 8B includes the first to fourth icon groups IG1z to IG4z. Unlike the exemplary embodiment shown in FIG. 4, according to the exemplary embodiment shown in FIG. 8A, the two icon groups indicated in the first sub-display part DSa and the second sub-display part DSb are not switched to the inactive state IG-S at the same time, but only one of the icon groups may be switched to the inactive state IG-S.

In detail, referring to FIGS. 8A and 8B, in the initial display state of the portable terminal EA, the first icon group IG1z and the second icon group IG2z are respectively displayed on the first sub-display part DSa and the second sub-display part DSb.

According to an exemplary embodiment of the invention, the external input may be sensed only through the first sub-display part DSa. That is, the external input is not detected through the second sub-display part DSb. Also, the icons IKOa included in the second icon group IG2z arranged in the second sub-display part DSb may be displayed in a translucent manner. That is, the second icon group IG2z displayed on the second sub-display part DSb may be moved to the first sub-display part DSa or switched to the inactive state IG-S according to the external input.

In an exemplary embodiment, as shown in FIG. 8B, when an external input is detected in the first sub-display part DSa, the second icon group IG2z may be displayed through the first sub-display part DSa and the first icon group IG1z may be switched into the inactive state IG-S, for example. In this case, the third icon group IG3z may be switched from the inactive state IG-S to the active state IG-M and displayed on the second sub-display part DSb. Likewise, the third icon group IG3z arranged in the second sub-display part DSb may be displayed semitransparent. That is, when the external input described with reference to FIG. 6 is dragged in the counterclockwise direction, the arrangement of the icons may be applied.

As another example, as shown in FIG. 8B, when the detected external input detected by the first sub-display part DSa is dragged clockwise, the second icon group IG2z may be switched to the inactive state IG-S. In this case, the first icon group IG1z may be displayed semi-transparent through the second sub-display part DSb and the fourth icon group IG4z may be switched from the inactive state IG-S to the active state IG-M and displayed on the first sub-display part DSa.

Figure 9:
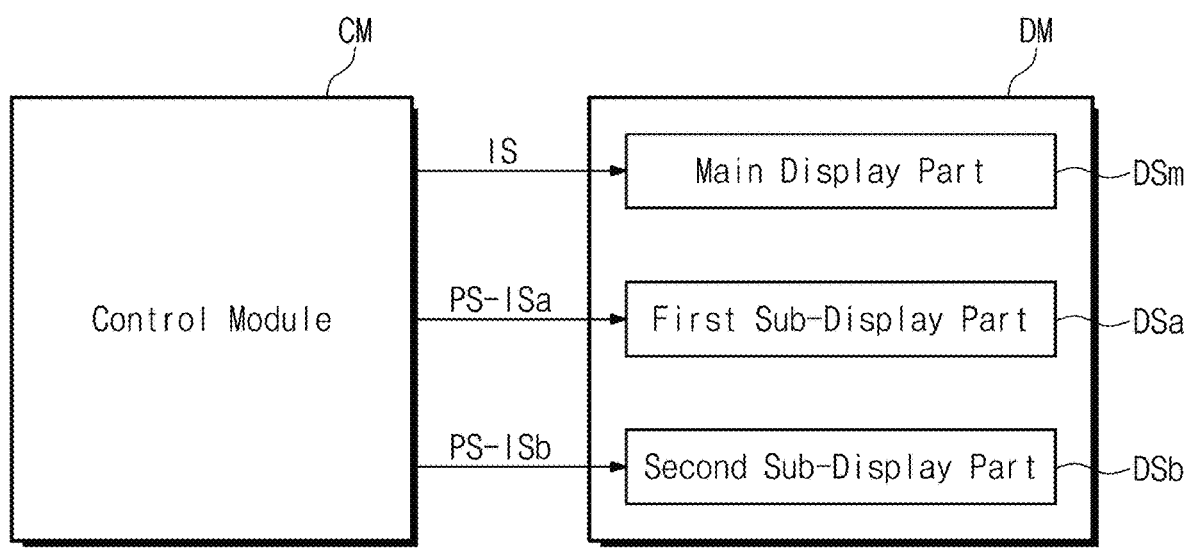
FIG. 9 is a block diagram illustrating another exemplary embodiment of an operation of a portable terminal according to the invention.
Figure 10:
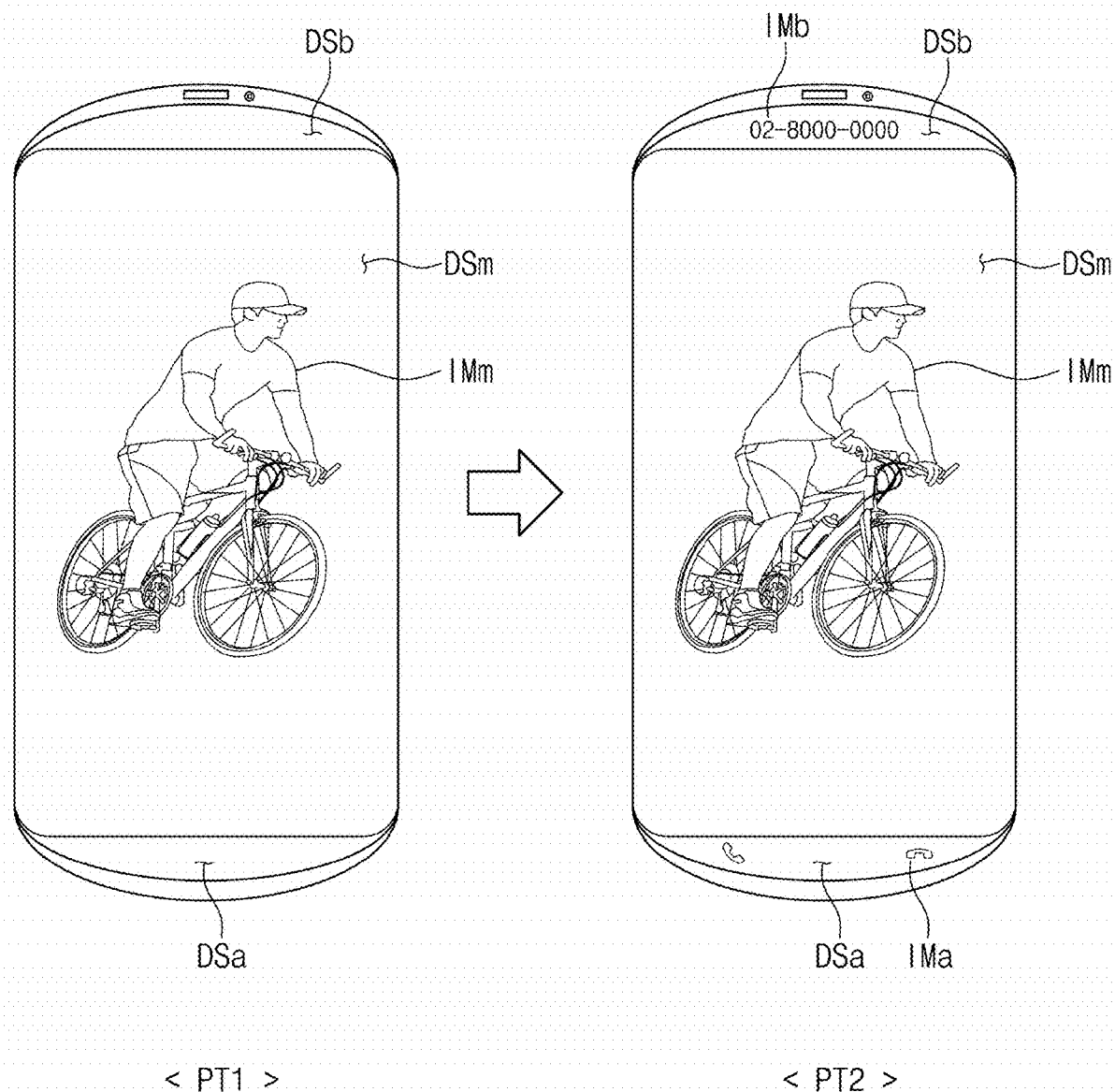
FIG. 10 is a plan view of another exemplary embodiment of a portable terminal according to the invention.
Figure 11:
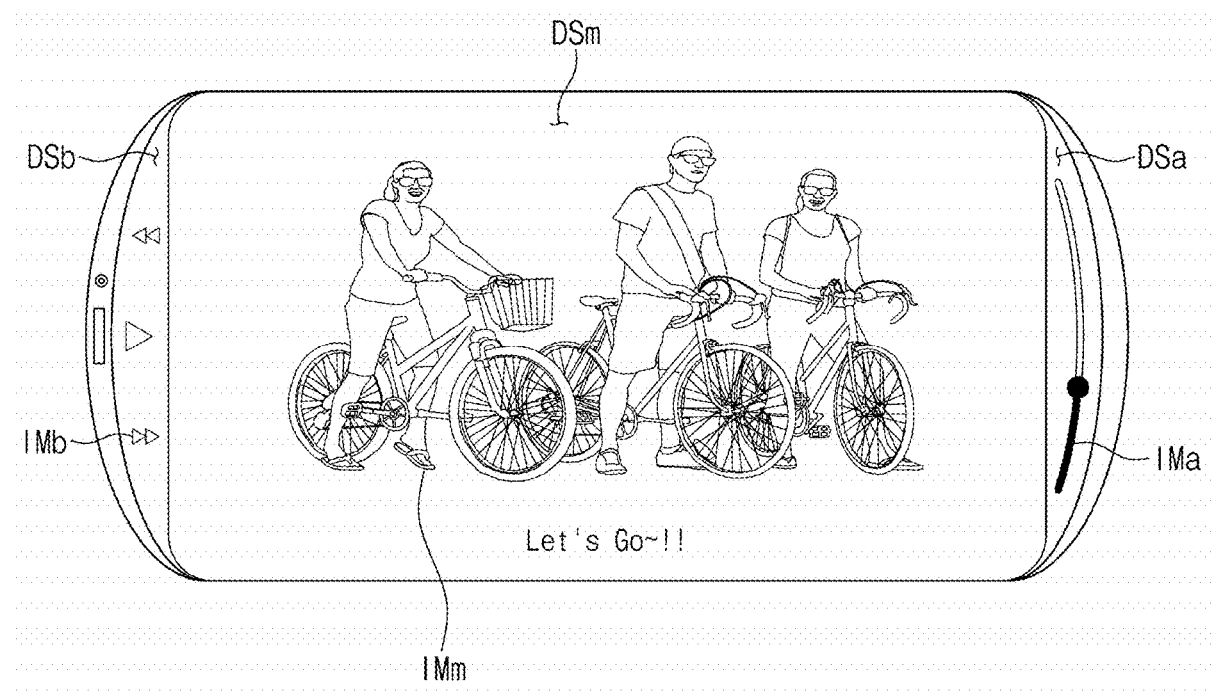
FIG. 11 is a plan view of another exemplary embodiment of a portable terminal according to the invention.

FIG. 9 is a block diagram illustrating another exemplary embodiment of an operation of a portable terminal according to the invention. FIG. 10 is a plan view of another exemplary embodiment of a portable terminal according to the invention. FIG. 11 is a plan view of another exemplary embodiment of a portable terminal according to the invention.

Referring to FIG. 9, the display module DM includes a main display part DSm, a first sub-display part DSa, and a second sub-display part DSb. The main display part DSm may display the main image and the first sub-display part DSa and the second sub-display part DSb may display the first sub-image and the second sub-image.

The control module CM may output to the display module DM an image signal IS corresponding to the main image, and a first sub-image signal PS-ISa and a second sub-image signal PS-ISb corresponding respectively to the first sub-image and the second sub-image.

According to an exemplary embodiment of the invention, while displaying the main image through the main display part DSm, the display module DM may display the first sub-image PS-ISa and the second sub-image PS-ISb simultaneously through the first sub-display part DSa and the second sub-display part DSb.

Referring to FIG. 10, the portable terminal EA may operate in a first section PT1 and a second section PT2. The first section PT1 may be a section in which an image different from the image of the main display part DSm is not displayed through the first sub-display part DSa and the second sub-display part DSb. The second section PT2 may be a section in which an image different from the image of the main display part DSm is displayed through the first sub-display part DSa and the second sub-display part DSb.

First, during the first section PT1, the portable terminal EA displays the main image IMm through the main display part DSm. In this case, the portable terminal EA may not display any other image through the first sub-display part DSa and the second sub-display part DSb.

Although not shown in the drawing, when no other image is displayed through the first sub-display part DSa and the second sub-display part DSb, the main image IMm may be expanded and displayed through the first sub-display part DSa and the second sub-display part DSb.

During the second section PT2, the portable terminal EA may display the first sub-image IMa and the second sub-image IMb different from the main image IMm through the first sub-display part DSa and the second sub-display part DSb.

According to an exemplary embodiment, the first sub-image IMa and the second sub-image IMb may include pop-up information, for example. The pop-up occurs while the main image IMm is displayed from the main display part DSm, and for example, information such as an incoming call, message content, etc., may be popped up. In this case, a first sub-image IMa and a second sub-image IMb including pop-up information may be displayed through the first sub-display part DSa and the second sub-display part DSb, respectively.

As shown in FIG. 10, the call icon may be displayed through the first sub-display part DSa, and the telephone number may be displayed through the second sub-display part DSb.

As described above, the pop-up information may be displayed through the first sub-display part DSa and the second sub-display part DSb, rather than being displayed on the main display part DSm. Therefore, as the main image IMm displayed on the main display part DSm is not covered by the pop-up information, the visibility of the main image IMm may be further improved.

As shown in FIG. 11, as another example, a volume control button of image may be displayed through the first sub-display part DSa and a control button of image may be displayed through the second sub-display part DSb.

Similarly, while the main image IMm is displayed, since the control buttons or the volume control buttons necessary for controlling the image are not displayed in the main image IMm, the visibility of the main image IMm may be further improved.

According to an exemplary embodiment of the invention, a main image may be displayed through a main display part, and a sub-image such as an icon or a pop-up may be displayed through a sub-display part. Thus, the visibility of the main image may be more convenient.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

What is claimed is:

1. A portable terminal comprising:
a display module including a main display part and a sub-display part adjacent to the main display part; and
a control module which controls a main image displayed on the main display part and icon groups displayed on the sub-display part,
wherein, when a first icon group among the icon groups is in an active state in which the first icon group is displayed through the sub-display part, a second icon group among the icon groups is controlled to be in an inactive state in which the second icon group is not displayed through the main display part and the sub-display part,
wherein when an external input is detected on the sub-display part, the second icon group is controlled to be in an active state in which the second icon group is displayed through the sub-display part,
wherein the sub-display part comprises a first sub-display part and a second sub-display part spaced apart with the main display part interposed therebetween, and
wherein the first icon group comprises a first sub-icon group displayed on the first sub-display part and a second sub-icon group displayed on the second sub-display part.

2. The portable terminal of claim 1, wherein when the external input is detected on at least one of the first sub-display part and the second sub-display part, at least one of the first sub-display part and the second sub-display part displays the second icon group.

3. The portable terminal of claim 2, wherein the second icon group comprises a third sub-icon group and a fourth sub-icon group,
wherein when the external input is detected on at least one of the first sub-display part and the second sub-display part, the third sub-icon group is displayed through the first sub-display part and the fourth sub-icon group is displayed through the second sub-display part.

4. The portable terminal of claim 3, wherein when the third sub-icon group and the fourth sub-icon group are respectively displayed through the first sub-display part and the second sub-display part, each of the first sub-icon group and the second sub-icon group is switched to the inactive state.

5. The portable terminal of claim 1, wherein when the external input is detected on the first sub-display part, the second sub-icon group is displayed through the first sub-display part, and the second icon group is displayed through the second sub-display part.

6. The portable terminal of claim 5, wherein an icon group displayed on the second sub-display part among the icon groups is translucent.

7. The portable terminal of claim 5, wherein the first sub-icon group is switched to the inactive state.

8. The portable terminal of claim 1, wherein an area of the main display part is larger than an area of the sub-display part.

9. The portable terminal of claim 1,
wherein when a first external input of the external input is detected through the sub-display part, the second icon group is displayed through the sub-display part,
wherein when a second external input of the external input is detected through the sub-display part, a third icon group among the icon groups is displayed through the sub-display part,
wherein when the third icon group is displayed through the sub-display part, the first icon group and the second icon group are switched to the inactive state.

10. The portable terminal of claim 1,
wherein when a first external input of the external input is detected through the sub-display part, the second icon group is displayed through the sub-display part,
wherein when a second external input of the external input is detected through the sub-display part, the first icon group is displayed through the sub-display part,
wherein while the first icon group is displayed through the sub-display part by the second external input, the second icon group and the other icon groups of the icon groups are switched to the inactive state.

11. The portable terminal of claim 1, wherein the first sub-display part extends from one end of the main display part and the second sub-display part extends from the other end of the main display part.

12. The portable terminal of claim 11, wherein in a plan view, each of the first sub-display part and the second sub-display part has a semicircular shape, and an outline of each of the first sub-display part and the sub-display part has a curve.

13. The portable terminal of claim 1, wherein the display module further comprises a bezel portion spaced from the main display part and adjacent the sub-display part,
wherein the bezel portion is provided in a curved shape.

14. A portable terminal comprising:
a display module including:
a main display part which displays a main image;
a first sub-display part which displays a first sub-image, and
a second sub-display part which is spaced apart from the first sub-display part with the main display part interposed directly therebetween and displays a second sub-image; and
a control module which outputs to the display module an image signal corresponding to the main image, and a first sub-image signal and a second sub-image signal corresponding to the first sub-image and the second sub-image, respectively,
wherein the display module displays the first sub-image through the first sub-display part and displays the second sub-image through the second sub-display part while the main image is displayed.

15. The portable terminal of claim 14, wherein the display module further comprises a first bezel portion spaced from the main display part and adjacent the first sub-display part and a second bezel portion adjacent the second sub-display part,
wherein each of the first bezel portion and the second bezel portion is provided in a curved shape.

16. The portable terminal of claim 15, wherein an area of a central portion of each of the first bezel portion and the second bezel portion is larger than an area of an edge portion, and a camera module and an audio output module are disposed at the central portion.

17. An icon arrangement method of a portable terminal, the method comprising:
displaying a first icon group among a plurality of icon groups through a sub-display part adjacent to a main display part of a display module;
sensing an external input through the sub-display part; and
displaying a second icon group among the icon groups through the sub-display part according to the external input sensed through the sub-display part,
wherein in a case of an active state in which the first icon group is displayed through the sub-display part, the second icon group is in an inactive state in which the second icon group is not displayed through the sub-display part, and
wherein when a first external input of the external input is detected through the sub-display part, the second icon group is displayed through the sub-display part,
wherein when a second external input of the external input is detected through the sub-display part, at least one of the first icon group and a third icon group among the icon groups is displayed through the sub-display part.

18. The method of claim 17, wherein each of the icon groups comprises at least one icon.

* * * * *